(No Model.)

W. E. CRANDALL.
TOY.

No. 271,427. Patented Jan. 30, 1883.

WITNESSES:
Chas. Nida
Jno. N. Bruns.

INVENTOR
William E. Crandall
BY
ATTORNEY

UNITED STATES PATENT OFFICE.

WILLIAM E. CRANDALL, OF NEW YORK, N. Y.

TOY.

SPECIFICATION forming part of Letters Patent No. 271,427, dated January 30, 1883.

Application filed November 17, 1882. (No model.)

*To all whom it may concern:*

Be it known that I, WILLIAM E. CRANDALL, of the city, county, and State of New York, have invented a new and useful Improvement in Toys; and I do hereby declare the following to be a full, clear, and exact description of the same, reference being had to the accompanying sheet of drawings, forming part of this specification.

This invention has for its object an improvement in toys; and the invention is a toy consisting of a series of blocks, each block having the form and ornamentation of a bound book, with a letter of the alphabet and a number placed on the back, and a series of pictures on the sides, having names commencing with said letter on its back.

The invention further consists in placing on the backs of said blocks a list of the pictures found on their sides; and the invention still further consists in combining with the aforesaid blocks a book-case, all arranged for the purpose hereinafter described.

Figure 1:
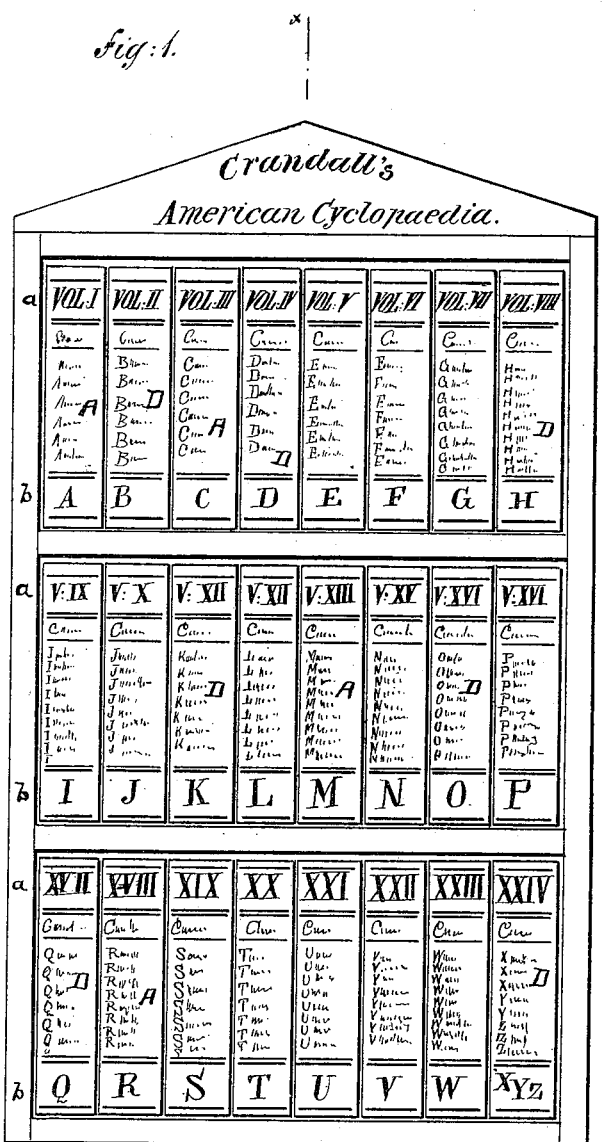
Figure 2:
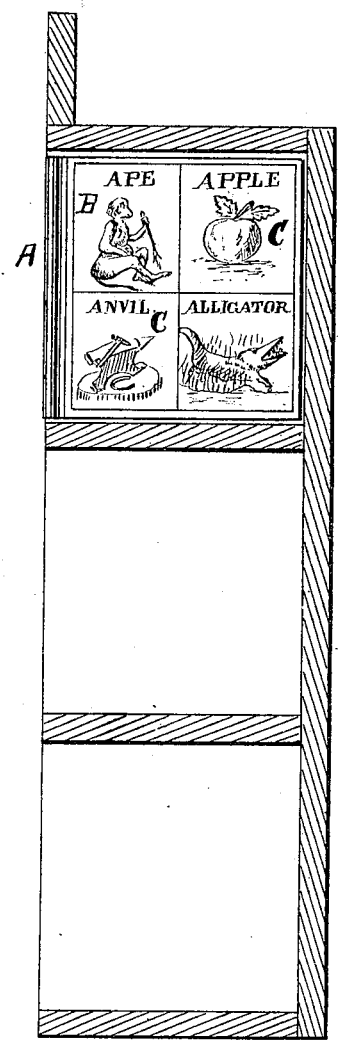
Figure 3:
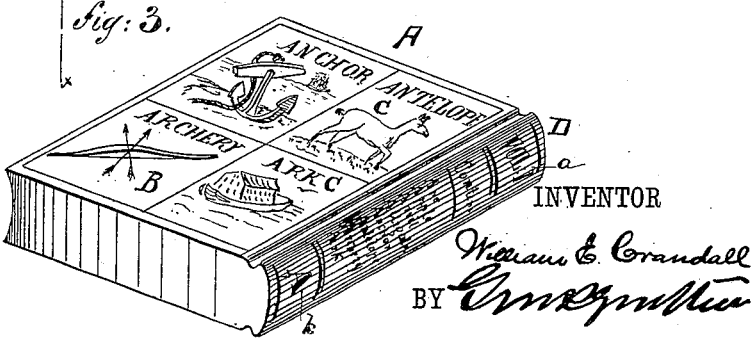

In the accompanying sheet of drawings, Figure 1 is a front elevation of blocks in case; Fig. 2, a longitudinal section of same, taken in line $x$ $x$, Fig. 1. Fig. 3 is a perspective view of a block out of case.

Similar letters of reference indicate like parts in the several figures.

As before stated, this invention is in the nature of a toy—that is, toy blocks—which will teach the child his letters, make him familiar with the names of certain pictured objects, and at the same time enable him to cultivate and appreciate the importance of order and regularity by the systematic arrangement of the blocks in their case according to the numbers and letters on their backs. To that end I construct my blocks A of wood or any other suitable material, and of any convenient size, each block having the form, general appearance, and ornamentation of a book.

On the sides B of each block are placed a series of pictures, C, of objects, all of whose names begin with the same letter; and on the back D of each block is placed a numeral, $a$, and a letter of the alphabet, $b$. Besides this numeral and letter the names of the pictures may be placed on the back of the block, which will indicate, in the nature of an index, the names of the pictures on the sides of the book, so that, to all intents and purposes, each block will contain the salient features of a book—viz., the number of the volume on its back, pictures, and reading-matter, and an index, besides a case to contain them.

Having now described my invention, what I claim as new, and desire to secure by Letters Patent, is—

1. A series of toy blocks, each block having the shape of a book, containing on its sides pictures and the names thereof, and on its back a numeral and letter of the alphabet, as and for the purpose described.

2. In a series of toy blocks of book form, an index on the back, in combination with pictures placed on the sides thereof, substantially as is shown and described.

3. With a series of toy blocks in book form, the combination of a case, substantially as shown and described.

WM. E. CRANDALL.

Witnesses:
G. M. PLYMPTON,
JNO. N. BRUNS.